H. B. SAVAGE.
CLUTCH.
APPLICATION FILED OCT. 24, 1911.

1,039,595.

Patented Sept. 24, 1912.

2 SHEETS—SHEET 1.

WITNESSES
Samuel E. Wade.
Amos W. Hart.

INVENTOR
HIRAM B. SAVAGE,
BY Munn & Co.
ATTORNEYS

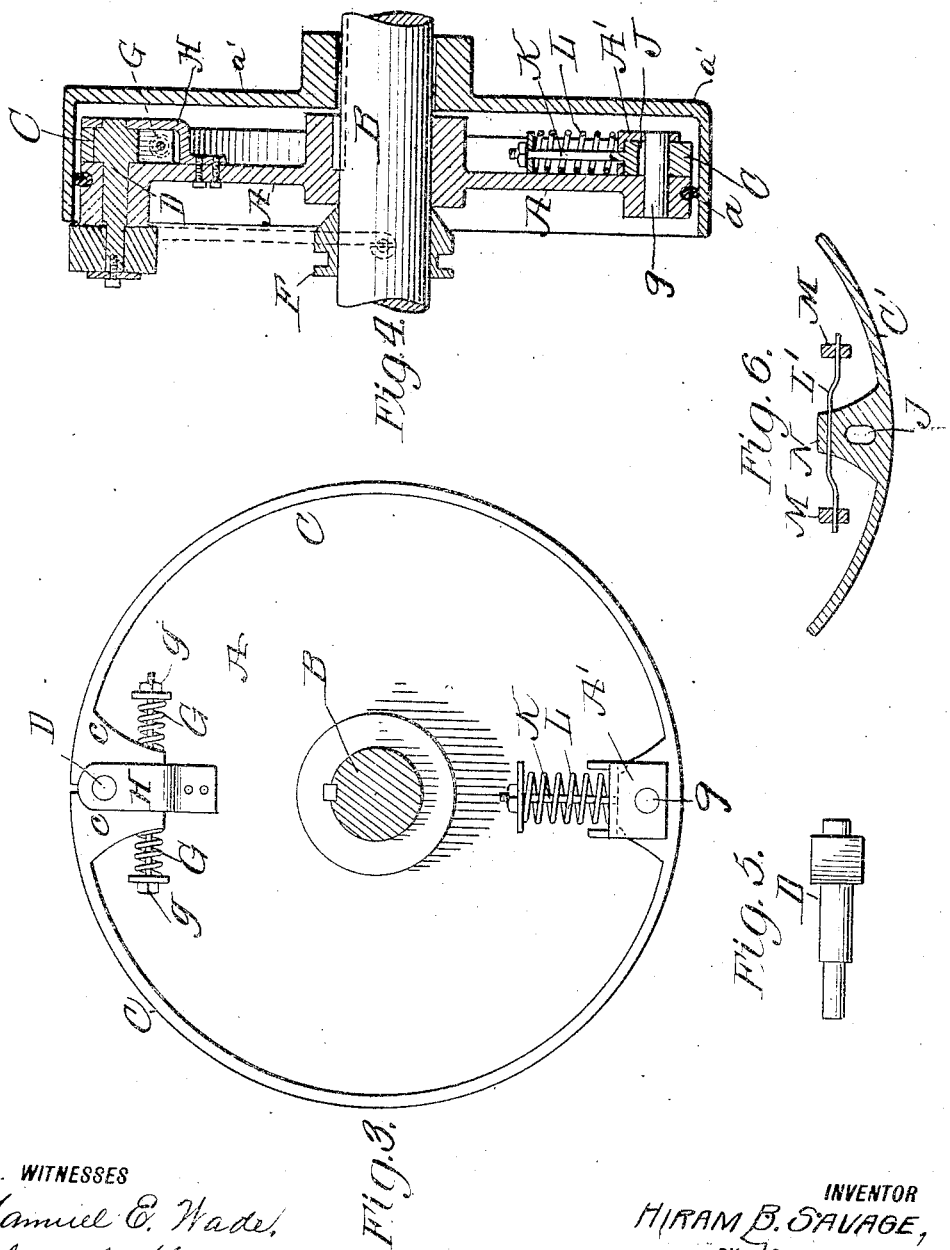

UNITED STATES PATENT OFFICE.

HIRAM B. SAVAGE, OF SPOKANE, WASHINGTON.

CLUTCH.

1,039,595.

Specification of Letters Patent.   Patented Sept. 24, 1912.

Application filed October 24, 1911. Serial No. 636,433.

*To all whom it may concern:*

Be it known that I, HIRAM B. SAVAGE, a citizen of the United States, and a resident of Spokane, in the county of Spokane and State of Washington, have invented an Improvement in Clutches, of which the following is a specification.

My invention is an improvement in that type of friction clutches in which an expansible ring is arranged within a cylindrical rim and adapted, when expanded, to firmly engage and lock with the same by friction. It is common to fasten such expansible rings at the center, or directly opposite the point where they are divided transversely, and, consequently, when the divided ends are forced apart by a cam, or equivalent device, the free or end portions of the ring are expanded most and the center practically not at all. Therefore, the ring does not take a friction hold on the rim at all points, as is desirable. I have overcome this objection by providing the center of the ring with a fastening that permits it to expand simultaneously and equally with the divided end portions, so that the ring engages the rim equally at all points.

The invention is hereinafter described as to details and operation, and illustrated in the accompanying drawings, in which—

Figure 2:
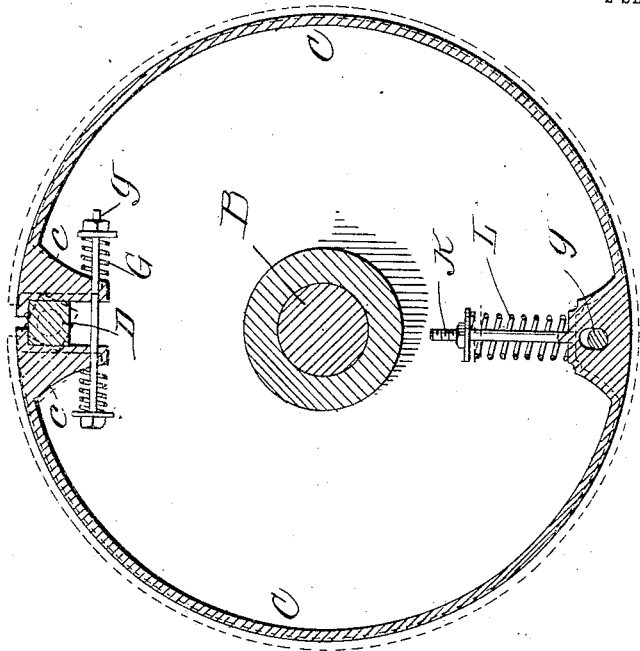
Figure 1:
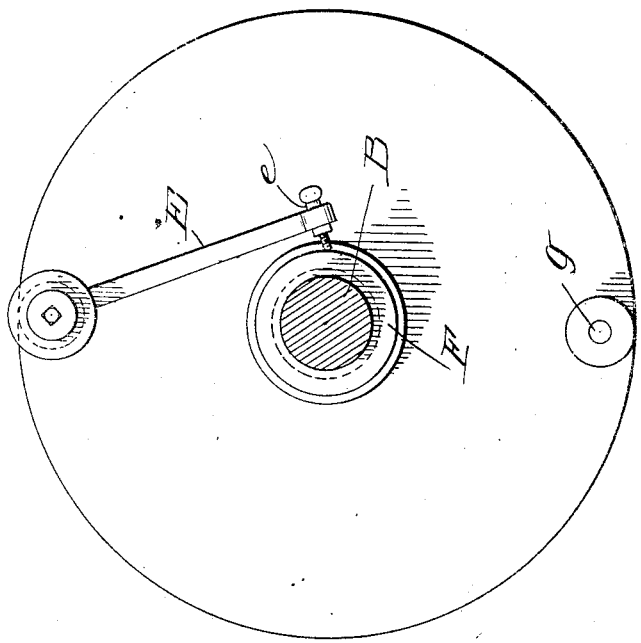

Figure 1 is a face view of the body of the clutch. Fig. 2 is a section of the same. Fig. 3 is a view of the face opposite the one shown in Fig. 1. Fig. 4 is a transverse or cross section of the clutch taken at right angles to that shown in Fig. 2 and including the pulley rim. Fig. 5 is a side view of the cam pin used for separating the divided ends of the ring and thus expanding it. Fig. 6 is a detail section illustrating a certain modification.

A indicates the radial flange or body of the clutch which is fastened to a rotatable shaft B.

C indicates the divided expansible spring ring, its ends being provided with inwardly projecting jaws c, as shown in Fig. 2. Between these jaws is arranged the cam pin D, the same having a squared portion and cylindrical portions, as shown in Fig. 5, whereby it is adapted to be supported rotatably in the thickened rim of the flange A, as shown in Fig. 4, and whereby also it is adapted for attachment of a cam lever E, as shown in Figs. 1 and 4. This lever is keyed on the reduced end of the cam pin D and its free end is provided with an adjustable screw e that bears upon the body of a cone F which is adapted for adjustment lengthwise of the shaft B. By such adjustment, it is obvious the lever E may be thrown laterally to a greater or less extent, and, therefore, the squared portion or head of the cam pin D may be rotated, as indicated by dotted lines in Fig. 2, so as to separate more widely the jaws c of the ring C and thus expand the ring as a whole.

In large clutches, it is requisite that a spring attachment shall be made to the jaws c of the ring C, and this is shown in Figs. 2 and 3, where spiral springs G are applied to a rod g that passes through the jaws c as shown. The springs are of the compression type and serve to normally hold the jaws c approximated; or, in other words, they resist expansion of the ring, which resistance is overcome by the cam and lever attachment already described. A bent bracket H, shown in Figs. 3 and 4, serves as a support or bearing for the adjacent end of the cam pin D and also holds the jaws c in the required normal position.

A pin I is shown passing transversely through the hub or flange A at a point directly opposite the divided portion of the ring C, and also through a bracket A′ forming an attachment of the hub or flange A. It also passes through a slot J in the ring C, whose longer axis is radial with the shaft B. A pin or rod K extends inward from the ring C at this point and a spiral spring L is applied thereto. The same is arranged between the bracket A′ and a nut applied to the pin or rod.

In constructing the clutch, the flange A and the ring C are fitted to place, and the pin is inserted through the flange A and through the slot in the ring C. It is obvious if the pin exactly fitted a hole at that point, it would prevent the ring C from contact with the adjacent portion of the pulley rim and also for a considerable distance on either side of this point when the ring is expanded by the means already described. While the ring C prevents the rim from slipping toward the center and so forcing the opposite side of the ring into contact with the pulley rim at that point, it is also clear that the slot J allows the ring to slip away from the center and to come into contact with the pulley rim at that point, when an expansion takes place. Thus the entire periphery of the ring C is brought into contact with the pulley rim and the efficiency of the clutch is materially improved. The spring L applied to the pin K, as shown, has sufficient tension to prevent centrifugal action from throwing the ring out into contact with the pulley rim when not expanded by the cam attachment. In practice, the expansion of the ring applies stress to the spring to such a degree that it is expanded and the adjacent portion of the ring is forced out into contact with the pulley rim the same as at any other point.

In Fig. 6 I show a modification in which a plate spring L' is secured in arms or brackets M attached to or forming an integral portion of the flange A, the central portion of such spring passing through a lug N formed on the ring C'. In other words, Fig. 6 illustrates how a flat spring can be used in place of a spiral one for holding the ring up to its normal place. The spiral spring is, however, preferable save in very small clutches where there is not sufficient space for it between the ring and the shaft.

In order that the clutch may be rendered dust-proof, the periphery of the flange A is provided with a groove, as shown in Fig. 4, which groove is provided with packing $a$ over which the pulley rim $a'$ extends so as to cover it and form close contact therewith, so that dust is prevented from access to the working parts, and thus made to pick up the load very easily and to wear much longer than when the clutch is left entirely open at that point.

While it is preferable that the pin D should be arranged at the central portion of the split rim, and while in practice it would always be placed at this point; it will be understood that it is not essential to the working of the clutch, but the pin may be located considerably to either side of the center of the rim and the clutch will give almost equally good results.

What I claim is:—

1. The combination with a shaft and a flange secured thereto and having a pin arranged transversely in its periphery, of a divided spring ring having a radial elongated opening in its central portion to receive said pin, and a spring attachment applied at that point and serving to hold the ring retracted or normally out of contact with the adjacent pulley rim, and means for expanding the ring, substantially as described.

2. The combination with a shaft and a clutch flange secured thereto, of a pin arranged transversely at a point on its periphery, a divided spring ring through whose center the said pin passes, a pin projecting radially inward from the ring at that point, a spring applied to the pin and serving to draw the ring inward and thus resist centrifugal action, and means for expanding the ring, substantially as described.

HIRAM B. SAVAGE.

Witnesses:
 GEO. HYATT,
 L. B. MACK.